Sept. 20, 1966   K. K. KENNEPOHL   3,273,716
LIQUID PETROLEUM FUEL CLEANER
Filed Jan. 6, 1964

INVENTOR.
KENNETH K. KENNEPOHL
BY
Beehler & Shanahan
ATTORNEYS.

United States Patent Office 3,273,716
Patented Sept. 20, 1966

3,273,716
LIQUID PETROLEUM FUEL CLEANER
Kenneth K. Kennepohl, 46151 N. Sierra Highway,
Lancaster, Calif.
Filed Jan. 6, 1964, Ser. No. 335,824
4 Claims. (Cl. 210—120)

The invention has reference to the problems confronting the handling of liquid petroleum in both liquid and gaseous form and is especially concerned with elimination of impurities of various kinds before the liquid petroleum in gaseous form reaches the carburetor of a combustion engine.

Liquid petroleum products which, for a considerable length of time have been very acceptable in producing gas for lighting and heating purposes, have been used only sparingly in combustion engines as a substitute for conventional gasoline and diesel fuel. There has, however, been a very marked increase in interest in adopting liquid petroleum products for combustion engine use, but various problems have had to be met and solved.

Important among the problems is the need for keeping the liquid petroleum product entirely clean before it enters the carburetor of an engine. Impurities which can be tolerated in the average gas burning operation cannot be tolerated to the same extent when the material is used as a combustion engine fuel.

Most of the contaminants in such instances become dissolved in the fuel after the fuel leaves the producer's storage. Consequently, even though the producer delivers satisfactorily clean fuel to the distributor by sophisticated processes, there is abundant opportunity thereafter for the fuel to collect impurities in an amount sufficient to greatly impair the operation of a combustion engine. For example, investigations have indicated that the fuel may collect as much as .7 ounce of sundry impurities in 1000 pounds of fuel when pumped to storage tanks, distributing tanks, and ultimately into the tank of the vehicle. This amount is about one teaspoonful in two hundred forty-five (245) gallons. The amount indicated comes very close to being sufficient, after operation of no more than a few thousand miles, to shut down the converter carried by the vehicle which converts the fuel from liquid form under pressure to gaseous form under relatively lower pressure for use in the engine. The major sources of impurities are lubricants, odorants, hydrogen sulphide, packing oil and grease, rust, mill scale, polymerization products, hose extracts and plastic materials. Even though most lubricants represented in the list are primarly insoluble, even these are soluble to at least some degree in propane, which is a common liquid petroleum fuel. Others, as for example, hydrogen sulphide, are completely soluble and could not under any circumstances be eliminated by any known filtering medium. Further still, even though a filter medium be selected which is fine enough to filter out most of the very fine impurities, these impurities are so fine that the filter soon becomes packed with the impurities sufficient to stop the flow of fuel to the engine. It is, therefore, among the objects of the invention to provied a new and improved combination convertor and filter for liquid petroleum fuel.

Another object of the invention is to provide a new and improved device for removing both soluble and insoluble impurities from liquid petroleum fuel prior to employment of the fuel in a gaseous condition.

Another object of the invention is to provide a new and improved device for the removal of impurities from liquid petroleum fuel which is proof against clogging despite the fineness of the material removed and which can be cleaned by a simple draining operation.

Still another object of the invention is to provide a new and improved device for removing impurities from liquid petroleum fuel which is adapted to make use of oil accumulated during the removal process to enhance further removal action.

Still another object of the invention is to provide a new and improved device for removing impurities from liquid petroleum fuel which permits the convertor to continue operation at full efficiency and full capacity while the removal operation is being performed and at all times while the device remains installed in the line.

Also included among the objects of the invention is to provide a new and improved device for removal of impurities from liquid petroleum fuel which can, whenever desired, be incorporated into the convertor and which is simple, non-complicated in construction and operation, which is compact and easily installed in a liquid petroleum line, and which is proportionately inexpensive.

With these and other objects in view, the invention consists in the construction, arrangement and combination of the various parts of the device, whereby the objects contemplated are attained, as hereinafter set forth, pointed out in the appended claims and illustrated in the accompanying drawings.

Figure 1:
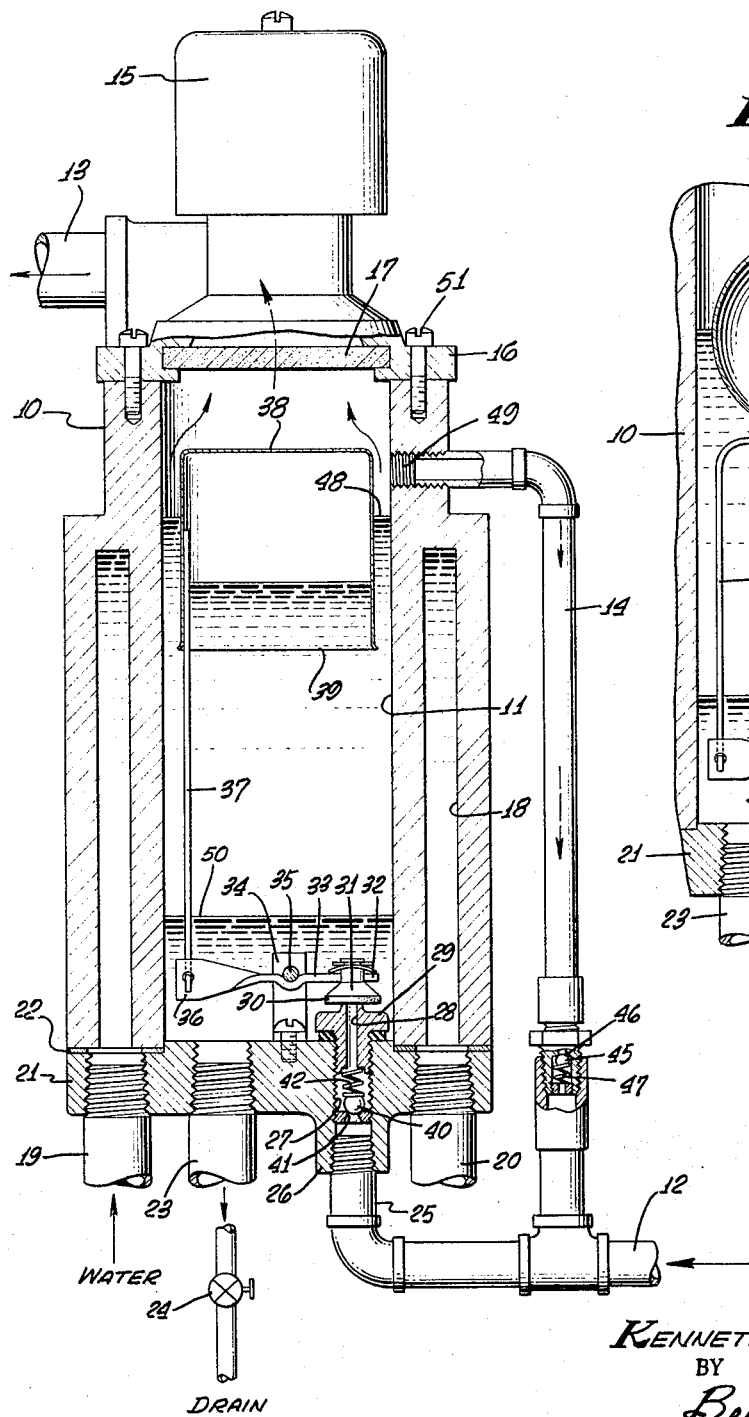
FIGURE 1 is a longitudinal sectional view of the device showing connections to a liquid petroleum line and a suitable hot water line.

In the form of the device shown in the drawings and herein described for purposes of illustration, there is employed a housing 10 within which is a conversion chamber 11 supplied by a supply line 12 from which a discharge line 13 leads outwardly at the top. A return line 14 provides a communication between the upper portion of the conversion chamber 11 and the supply line 12.

To selectively control the discharge line, use is made of a control device 15 of substantially conventional construction which is mounted on a head flange 16 and is adapted by appropriate means to open and close access to the discharge line. The head flange also makes provision for the mounting of a filter element 17 which is adapted to filter out any insoluble impurities which may possible intend to pass upwardly with the gasified liquid petroleum fuel.

Inasmuch as the device is concerned with converting liquid petroleum fuel from a liquid state to a gaseous state, the exterior of the housing is provided with an annular hot water chamber 18 supplied by a hot water inlet pipe 19 and from which there is an outlet pipe 20. The pipes 19 and 20 are threaded into an appropriate base flange 21 which is secured by appropriate fastening means to the lower end of the housing, and between which is employed a suitable sealing gasket 22. A drain pipe 23 is also threadedly mounted in the base flange 21 so as to communicate with the bottom of the conversion chamber 11. A drain valve 24 may be provided at an appropriate location in the dran pipe 23.

The supply line 12 communicates with a riser 25 which threadedly engages a boss 26 on the exterior of the base flange 21. A supply passage 27 through the base flange communicates through a bore 28 in a fitting 29 with the conversion chamber 11. A valve seat 30 comprises a supply port for the conversion chamber and is adapted to be controlled by a valve element 31. The valve element 31 in turn is mounted on one end 32 of a first class lever 33 which is pivotally mounted on a bracket 34 by means of a pivot pin 35. The other end 36 of the lever 33 has attached to it a float arm 37 and the float arm is attached at its upper end to a float 38. In this embodiment the float is an inverted cup shaped float having an open lower end 39 in constant communication with the interior of the conversion chamber. When the float lowers, the valve element 31 is elevated, opening the supply port defined by the valve seat 30. Irrespective of the pressure condition within the conversion chamber, there can be no reverse flow through the supply line 12 because of the presence of an inflow check valve 40 which is normally urged against an inflow valve seat 41 by a spring 42.

A second check valve 45 located in the return line 14 is urged against a seat 46 by means of a spring 47.

In the operation of the device, liquid petroleum fuel in liquid form flows through the supply line 12, past the inflow check valve 40 and the supply port defined by the valve seat 30 into the conversion chamber. Flow is readily started because there is little or no liquid in the conversion chamber and hence the float 39 will move downwardly thereby to tilt the first class lever 33 in a counter clockwise direction to elevate the valve element 31. Customarily, when operation is begun, the conversion chamber 11 will have little or no fuel in it and this circumstance coupled with the presence of a limited amount of latent heat within the conversion chamber and in the liquid petroleum fuel itself will cause some of the liquid petroleum to change to gaseous form and rise as a gas to the top of the conversion chamber 11. As this gas forms, some of its will enter the open lower end 39 of the float 38 and progressively fill the interior of the float with gaseous liquid petroleum fuel. The float, thus becoming buoyant, will be lifted when the liquid level of the liquid petroleum in liquid form reaches a level 48. For example, when the liquid lifts the float tilting the first class lever 33 in a clockwise direction until the valve element 31 seats upon the valve seat 30, the movement closes the supply line against supplying any further fuel to the conversion chamber. Should there be any pressure difference between the pressure chamber 11 and the supply line 12, this is counter balanced by reason of the fact that the conversion chamber is directly connected to the supply line through the return line 14. Liquid or gas accordingly is free to enter a return port 49 near the top of the conversion chamber under any condition of high pressure within the conversion chamber and pass downwardly through the return line 14 past the check valve 45 thereby to render the pressure condition within the conversion chamber 11 equal to the pressure condition in the supply line 12. Because of the direction of the check valves 40 and 45, the flow can be in only one direction as shown by the arrows in FIGURE 1.

Once the combustion engine, which is ordinarily interconnected with the housing, is started, the hot water from the engine will start flowing through the hot water inlet pipe 19 into the hot water chamber 18 through which it is free to circulate, and then outwardly through the outlet pipe 20. By warming the housing 10 in this fashion, liquid petroleum fuel is rapidly changed from a liquid state to a gaseous state within the conversion chamber, and the gaseous fluid then passes upwardly through the filter element 17 and out through a suitable discharge port (not shown) into the discharge line 13. If there is a constant demand for fuel in gaseous form from the discharge line 13, the liquid petroleum fuel will vaporize at a fairly rapid rate within the conversion chamber and cause the liquid level 48 to lower. As soon as this happens, the float 38 lowers and the valve element 31 is elevated admitting more petroleum fuel in liquid condition into the conversion chamber. A balance between supply and demand is maintained by action of the float 38 upon the valve element 31 as the control device 15 demands or rejects a supply of the liquid petroleum fuel in gaseous condition.

Due to the fact that there is a change in state from liquid to gas within the conversion chamber, and due to the fact that there is also an appreciable change in velocity as liquid fuel passes from the riser 25 through the bore 28 into the conversion chamber, there will be a tendency for virtually all of the objectionable impurities and contaminants to precipitate out. Solid contaminants will tend to fall promptly to the bottom of the conversion chamber. Those contaminants which are soluble in liquid petroleum or even those minute quantities of ordinarily insoluble materials which become suspended, or to a degree dissolved in the liquid petroleum also are precipitated out and fall to the bottom of the conversion chamber.

On the other hand, those contaminants and impurities which are soluble in the liquid fuel in liquid form are not soluble when the liquid fuel is in gaseous form, and consequently, upon the change in state from the liquid form to the gaseous form, the soluble contaminants remain in the liquid fuel in liquid form and settle at the bottom of the conversion chamber as the concentration builds up. The settling and entrapment of contaminants is enhanced appreciably on those occasions where there is provided a layer 50 of oil. This layer of oil may be supplied initially to the conversion chamber and in that case is preferably oil of substantially the same gravity and character as may be the oil which is partly dissolved in the liquid petroleum in liquid form although this equivalence is not critical. When such a layer of oil is employed, the fuel in liquid form will bubble up through the layer of oil after it passes the valve seat 30 and this action will have a filtering effect. Further still, contaminants which are released upon the change in state from liquid to gas gravitate toward the bottom of the conversion chamber and there are caught within the layer of oil, together with the insoluble contaminants.

Periodically, as the quantity of impurities builds up in the bottom of the conversion chamber, the chamber can be flushed at any time by opening the drain valve 24 for a period long enough to permit the impurities to flush out. This can be done at any time whether or not the fuel cleaner is in operation.

The filter element 17 is primarily a precaution and should be of relatively great porosity so as not to impair the free flow of gaseous fuel through it and is merely a secondary cleaning and filtering medium serving primarily the purpose of an extra precaution. This is because by the time the fuel reaches the top of the conversion chamber it has been converted to a pure gaseous state for discharge into the discharge line 13.

Should the device need servicing at any time, access is readily had to the interior by removing the head flange 16 after loosening appropriate cap screws 51. Should it be advisable to tear down the device still further, the base flange 21 can be removed in order to gain access more readily to a valve element 31 and the fitting 29 so that these parts can be serviced or replaced.

Figure 2:
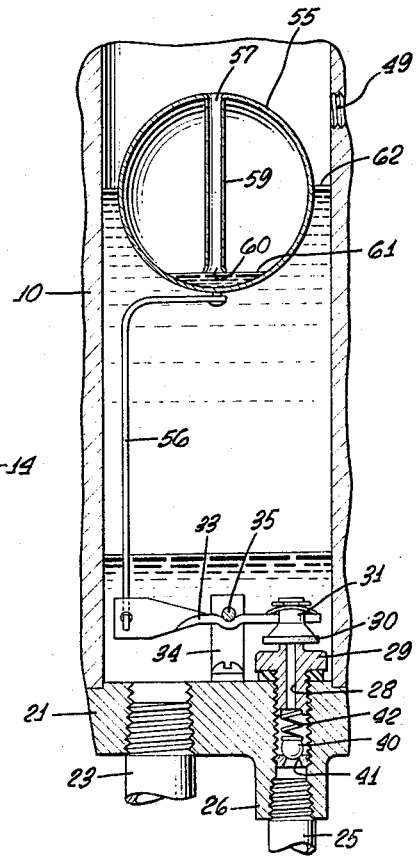
FIGURE 2 is a fragmentary longitudinal sectional view showing the device equipped with an alternate type of float.

Although the cup shaped float 38 described in connection with FIGURE 1 is a very simple expedient, there may on some occasions be need for a float of different design, such as the closed float device illustrated in operative position in FIGURE 2. In this form of the invention there is provided a ball float 55 attached by means of a float arm 56 to the first class lever 35 in the same manner as has been described in connection with FIGURE 1. The ball float has an opening 57 at the top and extending downwardly from the opening into a float chamber 58 is a down pipe 59 which communicates with the float chamber 58 at the bottom of the down pipe through an open end 60 of the down pipe. Where there is initially some fuel in liquid form, as for example, the layer 61 of fuel in the float chamber 58, this material in liquid state will seal off the open end 60 and gaseous fuel thereafter remaining in the float chamber will provide the needed buoyant effect for the ball float when resting upon a body 62 of the fuel in liquid form.

Upon shutting down operation of the device, the housing 10 gradually cools off and such fuel as may initially be in gaseous form will be gradually converted to liquid form, but inasmuch as the conversion chamber 11 is hermetically sealed, there will always remain a degree of gaseous material in the upper portion of the ball float 55. Even though this might be insufficient to give a proper buoyant effect to the ball float, a proper condition will be quickly gained as soon as the device is again placed in operation. Under such circumstances, flow will again take place through the discharge line 13, and conversion will proceed in the conversion chamber as fuel in liquid form changes to fuel in gaseous form. At the same time, fuel in liquid form comprising the layer 61 in the ball float 55 will also change to gaseous form, and the accumulation of fuel in gaseous form in the float chamber 58 will force a necessary amount of the fuel in liquid form upwardly through the down pipe 59 and the opening 57 into the conversion chamber. Hence, there will virtually always remain a sufficient amount of fuel in gaseous form within the ball float 55 to give it the desired degree of buoyancy so that it will be in operation almost on demand.

Elimination of undesirable contaminants takes place in the presence of the ball float 55 in the same fashion as has been described in connection with FIGURE 1.

It will therefore appear from the description and accompanying drawings that a very effective cleaning and filtering action takes place before the fuel in gaseous form passes from the top of the conversion chamber. Hence, no impurities will pass over into the discharge line 13 and the carburetor, the valves, valve seats and other accessories in the fuel line will handle purified gaseous fuel at all times. Further still, because of there being employed no filtering medium, action of the conversion chamber serving as a purifier will continue to work at all times and cannot become clogged. Such occasional draining the the bottom of the chamber can be done at infrequent intervals and will be sufficient to prevent an accumulation of impurities in the conversion chamber sufficient to render the device unworkable until cleaned.

While the invention has herein been shown and described in what is conceived to be the most practical and preferred embodiment, it is recognized that departures may be made therefrom within the scope of the invention, which is not to be limited to the details disclosed herein but is to be accorded the full scope of the claims so as to embrace any and all equivalent devices.

Having described the invention, what is claimed as new in support of Letters Patent is:

1. An eliminator for impurities in liquid petroleum fuel comprising a housing having a conversion chamber therein, said housing including means to convert said liquid fuel to gas in said chamber, said chamber having a supply port, a discharge means at the top to discharge said gas, a return port adjacent the top and a drain port at the bottom, said ports opening into said chamber, a liquid petroleum fuel supply line connected to said supply port having an inflow check valve therein, a return line connected between said return port and said supply line at a point upstream from said inflow check valve and an outflow check valve in said return line, a valve seat in said chamber at a location controlling said inflow port, and a valve operating device comprising an arm mounted in said chamber and having a valve element on said arm, said valve element being at a location adapted to seat on said seat, a float in said chamber and a float arm on said float connected to said arm, said float establishing a level of said liquid petroleum in said chamber, said float having a location in the upper half of the chamber adjacent said return port, said float being adapted to shift said valve element alternatively to open and closed positions in response to the change of level of said liquid petroleum, whereby to precipitate relatively non-volatile substances from said liquid petroleum fuel prior to the passage of said fuel in a gaseous state from said discharge means.

2. An eliminator for impurities in liquid petroleum fuel comprising a housing having a conversion chamber therein, said housing including means to convert liquid fuel to gas in said chamber, said chamber having a supply port at the bottom, a discharge means at the top to discharge said gas, a return port adjacent the top and a drain port at the bottom, a liquid petroleum fuel supply line connected to said supply port having an inflow check valve therein, a return line connected between said return port and said supply line at a point upstream from said inflow check valve and an outflow check valve in said return line, a valve seat in said chamber surrounding said inflow port, and a valve operating device comprising a lever arm pivotally mounted in said chamber and having a valve element on said lever arm, said valve element being adapted to seat on said seat, a float in said chamber and a float arm on said float connected to said lever arm, said float being connected to said lever arm, said float establishing a level of said liquid petroleum in said chamber, said float being located in the upper half of the chamber adjacent said return port and a layer of oil at the bottom of said chamber, said float being adapted to shift said valve element alternatively to open and closed positions in response to the change of level of said liquid petroleum, whereby to precipitate relatively non-volatile substances from said liquid petroleum fuel prior to the passage of said fuel in a gaseous state from said discharge means.

3. An eliminator for impurities in liquid petroleum fuel comprising a housing having a conversion chamber therein, means to convert said liquid fuel to a gas in said chamber including a hot water space for heated water at least partially surrounding said chamber and including an inlet pipe and an outlet pipe, said chamber having a supply port at the bottom, discharge means at the top to discharge said gas, a return port adjacent the top and a drain port at the bottom, a liquid petroleum fuel supply line connected to said supply port having an inflow check valve therein, a return line connected between said return port and said supply line at a point upstream from said inflow check valve and an outflow check valve in said return line, a knife edge annular valve seat in said chamber surrounding said inflow port, and a valve operating device comprising a level arm pivotally mounted at a fulcrum point thereof in said chamber and having a valve element on said lever arm at one side of the fulcrum, said valve element being at a location adapted to seat on said seat, a float in said chamber and a float arm on said float connected to said lever arm at the other side of the fulcrum, said float establishing a level of said liquid petroleum in said chamber, a layer of oil at the bottom of said chamber, said float being mounted on said float arm at a level adjacent said return port and below the top of the chamber, said float being adapted to shift said valve element alternatively to open and closed positions in response to a change of level of said liquid petroleum fuel, whereby to precipitate relatively non-volatile substances from said liquid petroleum fuel into said layer of oil prior to the passage of said fuel in a gaseous state from said discharge means, said drain port including valve means whereby to make periodic discharge of said non-volatile substances from the bottom of said chamber.

4. An eliminator for impurities in liquid petroleum fuel comprising a housing having a conversion chamber therein, said housing including means to convert liquid fuel to a gas in said chamber, said chamber having a supply port at the bottom, a discharge means at the top to discharge gas therefrom, a liquid petroleum fuel supply line connected to said supply port having an inflow check valve therein a return port near the top of said chamber and a return line from said return port to said supply line at a location upstream of said fluid check valve, and a valve device comprising an arm mounted in said chamber and having a valve element on said arm, said valve element being adapted to seat on said seat, a float in said chamber and a float arm on said float connected to said lever arm, said float establishing a level of said liquid petroleum in said chamber, said float comprising a hollow member mounted on said float arm, an opening at the top of said hollow member and a tube extending from said opening downwardly into the hollow member to a location adjacent to but spaced above the bottom of said hollow member, a layer of oil at the bottom of said chamber, a drain port means from said chamber below said layer of oil and a valve in said drain port means, said float being adapted to shift said valve element alternatively to open and closed positions in response to the change of level of said liquid petroleum fuel, whereby to precipitate relatively non-volatile substances from said liquid petroleum fuel prior to the passage of said fuel in a gaseous state from said discharge means.

References Cited by the Examiner

UNITED STATES PATENTS

| | | | |
|---|---|---|---|
| 559,857 | 5/1896 | Lillie | 159—44 |
| 890,227 | 6/1908 | Goss | 159—44 |
| 1,373,720 | 4/1921 | Gish | 210—296 X |
| 1,569,795 | 1/1926 | Wall | 210—180 X |
| 2,214,792 | 9/1940 | Klotz | 137—404 |
| 2,447,144 | 8/1948 | Thornton | 210—120 |
| 2,699,653 | 1/1955 | Ponsar | 137—424 X |
| 2,790,560 | 4/1957 | Beyland | 210—296 |
| 2,911,000 | 11/1959 | Doyle | 137—432 X |
| 2,940,467 | 6/1960 | Smith | 137—432 |

FOREIGN PATENTS

| | | |
|---|---|---|
| 112,646 | 3/1929 | Austria. |
| 361,261 | 10/1922 | Germany. |

REUBEN FRIEDMAN, *Primary Examiner.*

D. M. RIESS, *Assistant Examiner.*